United States Patent [19]

Metz

[11] 3,902,369

[45] Sept. 2, 1975

[54] MEASUREMENT OF THE DIFFERENTIAL PRESSURE OF LIQUID METALS

[75] Inventor: Hugh J. Metz, Knoxville, Tenn.

[73] Assignee: The United States of America as represented by the United States Energy Research and Development Administration, Washington, D.C.

[22] Filed: May 2, 1974

[21] Appl. No.: 466,347

[52] U.S. Cl. ............................................. 73/398 R
[51] Int. Cl.² ........................................... G01L 9/00
[58] Field of Search ....... 73/398 R, 398 C, 398 AR, 73/205 R, 152, 388; 417/50

[56] References Cited
UNITED STATES PATENTS

| | | | |
|---|---|---|---|
| 2,669,873 | 2/1954 | Gardner et al. | 73/398 R |
| 2,770,590 | 11/1956 | Serduke | 417/50 |
| 3,251,302 | 5/1966 | Baker | 417/50 |
| 3,364,749 | 1/1968 | Sipin | 73/398 R |
| 3,834,239 | 9/1974 | King | 73/398 R |

*Primary Examiner*—Donald O. Woodiel
*Attorney, Agent, or Firm*—Dean E. Carlson; David S. Zachry; Louis M. Deckelmann

[57] ABSTRACT

The flow of liquid metal in a pipe is opposed by a magnetic-type liquid metal pump until there is almost zero flow shown by a magnetic-type flowmeter. The pressure producing the liquid metal flow is inferred from the rate of rotation of the permanent magnet pump. In an alternate embodiment, a differential pressure transducer is coupled to a process pipeline by means of high-temperature bellows or diaphragm seals, and a magnetic-type liquid metal pump in the high-pressure transmission line to the pressure transducer can be utilized either for calibration of the transducer or for determining the process differential pressure as a function of the magnet pump speed.

4 Claims, 2 Drawing Figures

MEASUREMENT OF THE DIFFERENTIAL PRESSURE OF LIQUID METALS

BACKGROUND OF THE INVENTION

This invention was made in the course of, or under, a contract with the United States Atomic Energy Commission.

Liquid metal fast breeder reactors (LMFBR's) require measurements of the differential pressure of the flowing liquid metal coolant at several locations in the process stream. All of the presently available instruments have doubtful long-term reliability due to the fact that bellows or diaphragms are in direct contact with the flowing liquid metal (usually sodium). Such instruments may not be removable for calibration and repair, or, if removable, require up to four valves each to permit isolation from the process. In this case, the necessary valves also lack sufficient ruggedness and long-term reliability.

Thus, there exists a need for a long-term, reliable means for measuring of the differential pressure of flowing streams of liquid metal coolants in the process stream of a liquid metal fast breeder reactor or in other systems where there is a pressure difference to be measured or monitored. The present invention was conceived to meet this need in a manner to be described hereinbelow.

SUMMARY OF THE INVENTION

It is the object of the present invention to provide an improved means for measuring the differential pressure between any two points in a process liquid metal coolant loop, which means can be readily serviced without disturbing the process pipes and without the use of isolation valves.

This object has been accomplished in the present invention by providing a permanent magnet pump or other type magnetic pump in a feedback arrangement between any two points in a liquid metal coolant loop such that a measurement of the differential pressure between the points is inferred from the rate of rotation of the permanent magnet pump or power input to another type magnetic pump. The feedback arrangement defines somewhere in its length a nearly closed plane circular flow path in order to accommodate the permanent magnet pump or the equivalent for another type of magnetic pump.

In one embodiment of the present invention, a magnetic flowmeter is utilized in the feedback arrangement on the low- or the high-pressure side of the pump to control the speed of a motor or the power driving the pump in opposition to the process differential pressure such that only a constant low flow is maintained in the feedback arrangement for the purpose of carrying off some of the heat generated in the pump.

In another embodiment of the present invention, a similar pump is connected between a differential pressure transducer and a high-temperature seal on the high-pressure side of a liquid metal process stream, while the other side of the transducer is connected by means of another high-temperature seal to the low-pressure side of the process stream. In this embodiment, the pump can be utilized either to calibrate the transducer or as an alternate method to measure the differential pressure of the process stream as a function of pump speed or input.

In both of the above embodiments, the permanent magnet pumps or the magnetic flow meter, excepting the parts containing process fluid, can be removed for servicing and calibration, if desired, without disturbing the process stream pipes and without the use of isolation valves.

DESCRIPTION OF THE PREFERRED EMBODIMENTS

Figure 1:
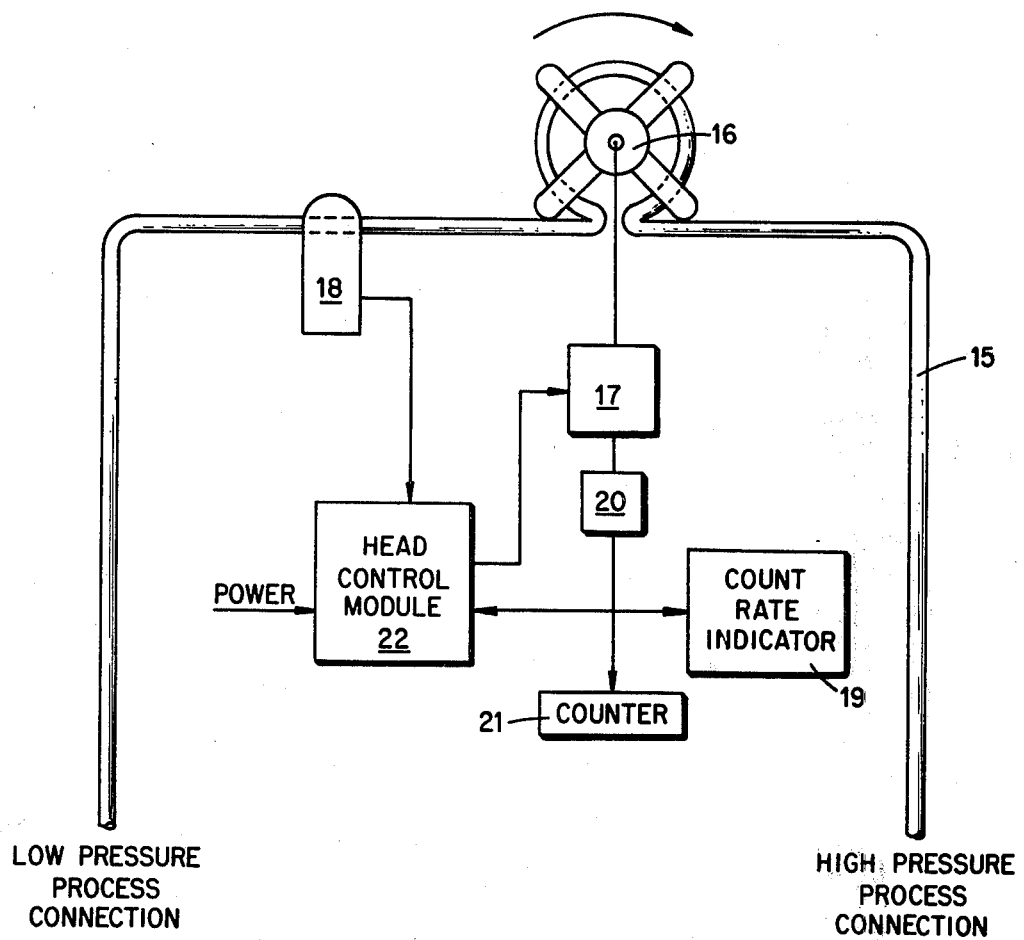
FIG. 1 is an illustrative drawing of one embodiment of the present invention.

In the embodiment illustrated in FIG. 1, a pipe 15 communicates between a high-pressure point and a low-pressure point in a liquid metal coolant stream, not shown. It is only necessary that somewhere in its length the pipe 15 accommodate a permanent magnet pump 16 or other type magnetic pump. With the pump 16 not operating, the conductive liquid metal tends to flow in the pipe 15 from the high-pressure side to the low-pressure side. A variable speed motor 17 turns the permanent magnet pump 16 in a direction that opposes the process differential pressure existing in the pipe 15 or the equivalent is done for other type magnetic pumps. A magnetic flowmeter 18 installed on the low-pressure side of the pump 16 controls the speed of the motor 17 by means of a head control unit 22 to maintain only a constant low flow of liquid metal in the pipe 15.

The motor 17 is coupled to a counter 21 and to a count rate indicator 19 by means of a tachometer 20. For other types of magnetic pumps, unit 19 would measure power input, or the equivalent. The unit 19 directly indicates the motor 17 rpm or frequency, and a measure of the differential pressure between the high- and low-pressure process connections is thus provided or inferred from the indicator 19. The unit 19 can be used to transmit a signal if desired.

It has been found preferable to maintain some small flow in the pipe 15 because it is useful in carrying off some of the heat generated in the pump 16. The differential pressure has been found to vary approximately linearly with motor speed, provided the pump is not operated near its high pressure limit.

Some additional features of the system of FIG. 1 include the following:

1. The pump can be operated intermittently if heat buildup is a problem.
2. The system completely eliminates bellows and diaphragms and can be made with substantial metal walls for the liquid metal.
3. A very important feature and an advantage over the existing systems is that the flowmeter magnet and the pump magnetic parts can be removed for servicing and calibration in a laboratory without disturbing the process pipes and without the use of isolation valves.

The system of FIG. 1 is applicable to Na, K, NaK, Li, Bi, Mg, Pb, or any highly conductive flowing liquid metal or to any static system containing such a metal where there is a pressure difference to be measured or monitored.

Figure 2:
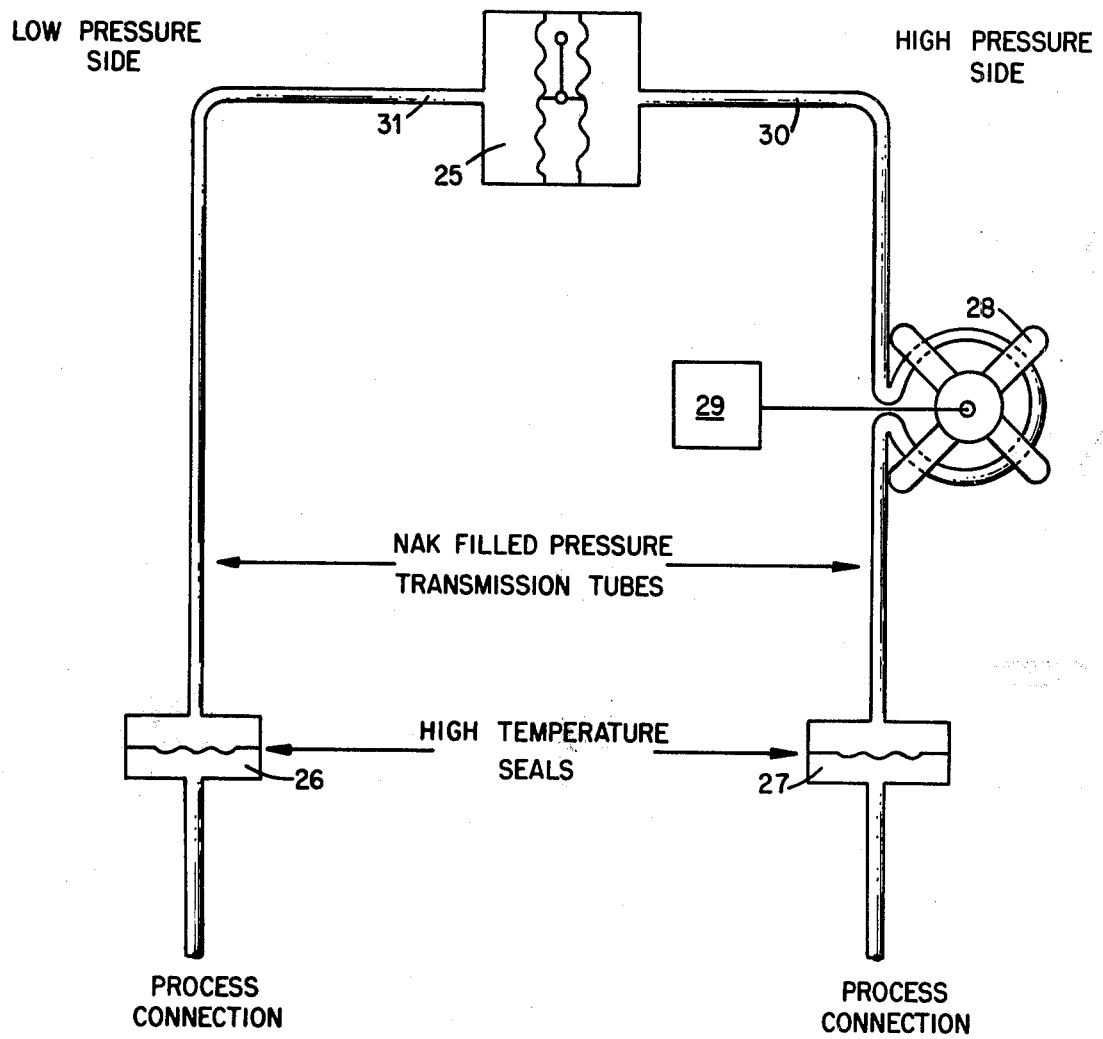
FIG. 2 is an illustrative drawing of another embodiment of the present invention.

When a pressure transducer is desired for use in measuring the differential pressure in a liquid metal or a molten salt coolant stream of a reactor, then the system of FIG. 2 is utilized, and since the transducer cannot stand the extreme temperatures of the process liquid metal, it must be operated in a cooler environment through the use of high-temperature seals.

In the embodiment illustrated in FIG. 2, a differential pressure transducer 25 is coupled to the process by means of high-temperature bellows or diaphragm seals 26 and 27. A magnetic-type pump 28, similar to the pump arrangement of FIG. 1, is connected between the seal 27 and the transducer 25 by means of a high-pressure transmission (capillary) line 30 with a coiled portion for the pump 28, so as to operate in the cooler environment of the transducer. The fluid in the line 30 must be electrically conducting for proper operation of the pump 28. A liquid metal, such as NaK, is suitable for this purpose. A similar line 31 is connected between the other side of the transducer 25 and the seal 26 on the low-pressure side of the process. The only additional requirement of the system of FIG. 2 is that the rpm of the motor 29 connected to the pump 28 be accurately known or the equivalent. A count rate indicator coupled to the motor 29 in the same manner as was done in FIG. 1 can be used for this purpose.

The operation of FIG. 2 is such that when there is no differential pressure from the process (process shutdown), the zero or lower range limit of the transducer 25 can be adjusted. Then, rotation of the pump 28 produces a differential pressure which is of known differential because of the pressure rise across the pump having been previously related to the speed of rotation of the pump. Thus, the span or upper range limit of the transducer can be adjusted.

When the process system is operating and the process differential pressure is being measured by the transducer 25, an independent check of the process differential pressure can be obtained by operating the pump 28 in the reverse direction. When the transducer 25 shows zero differential pressure, the process differential pressure is then inferred from the pump speed.

The pump 28 is intended just for calibration checks or occasional checks of the process pressure and therefore needs to be only run for short periods at a time. This manner of operation contributes negligible heat buildup to the fluid in the tube 30. The magnetic parts of pump 28 can be removed for laboratory calibration with an identical high-temperature pressure transducer and then reinstalled.

The system of FIG. 2 is thus seen to provide calibration of an installed differential pressure transducer without the disturbance of any process connections or the use of any valves or openings into the transmission fluid or the process system. The system of FIG. 2 can be used on processes that contain non-electrically conductive fluids such as molten salt or gases as well as on processes that contain electrically conductive fluids.

This invention has been described by way of illustration rather than by limitation and it should be apparent that it is equally applicable in fields other than those described.

What is claimed is:

1. A system for measuring the differential pressure of a process flowing coolant stream of liquid metals between a high-pressure point and a low-pressure point in said flowing stream comprising a pipe connected between said points, said pipe somewhere in its length accommodating a permanent magnet pump, a variable speed motor coupled to said pump for operating the pump such as to oppose the liquid metal pressure from said stream, an indicating means coupled to said pipe between said pump and said low-pressure point, means for regulating the speed of said motor until said indicating means provides a near-zero reading, and a count rate indicator coupled to said motor to provide an indication of the speed of said motor and when said indicating means reaches said near-zero reading then said motor speed indication thus provides an indication proportional to said differential pressure existing between said points.

2. The system set forth in claim 1, wherein said indicating means coupled to said pipe is a magnetic flowmeter, and said means for regulating the speed of said pump motor includes a head control unit coupled between said flowmeter output and said motor to regulate the motor speed to provide said near-zero reading on said flowmeter indicating means and thus a near-zero liquid metal flow through said loop while at the same time said count rate indicator is providing said differential pressure indication.

3. The system set forth in claim 1, wherein said indicating means coupled to said pipe is a differential pressure transducer, one side of said transducer and said pump being connected to said high-pressure point by means of a first high-temperature seal and the other side of said transducer being connected to said low-pressure point by means of a second high-temperature seal, said transducer adapted to be utilized to measure said differential pressure directly while said pump motor is not operating, said pump adapted selectively to be operated in one direction while said process stream is shut down for calibrating said transducer and to be operated in a reverse direction to oppose the pressure of said process stream when it is not shut down such that an independent check of the process differential pressure can be obtained when said transducer shows a zero differential pressure at which time the process differential pressure is inferred from the motor pump speed as provided by said count rate indicator, said pipe between said first high-temperature seal and said one side of said transducer containing a liquid metal for insuring proper operation of said pump during its use.

4. The system set forth in claim 3, wherein said process flowing coolant stream consists of a molten salt instead of liquid metals.

* * * * *